United States Patent
Cheng

(10) Patent No.: US 7,604,493 B2
(45) Date of Patent: Oct. 20, 2009

(54) CARD CONNECTOR

(75) Inventor: Yung-Chang Cheng, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/287,462

(22) Filed: Oct. 8, 2008

(65) Prior Publication Data

US 2009/0093167 A1 Apr. 9, 2009

(30) Foreign Application Priority Data

Oct. 8, 2007 (TW) .............................. 96216789 U

(51) Int. Cl.
*H01R 13/62* (2006.01)

(52) U.S. Cl. ..................................................... 439/159
(58) Field of Classification Search ................. 439/157, 439/159, 160, 152, 701
See application file for complete search history.

(56) References Cited

U.S. PATENT DOCUMENTS

| | | | | |
|---|---|---|---|---|
| 7,108,545 B2 * | 9/2006 | Ting | ........................ | 439/541.5 |
| 7,226,311 B2 * | 6/2007 | Sugita | ..................... | 439/541.5 |
| 7,497,727 B2 * | 3/2009 | Ting | ........................ | 439/541.5 |
| 2006/0089033 A1 * | 4/2006 | Chen | .......................... | 439/159 |
| 2007/0178733 A1 * | 8/2007 | Sadatoku | ..................... | 439/159 |
| 2007/0259547 A1 * | 11/2007 | Yu et al. | ..................... | 439/159 |
| 2008/0050937 A1 * | 2/2008 | Miyao et al. | ................... | 439/64 |

\* cited by examiner

*Primary Examiner*—Neil Abrams
*Assistant Examiner*—Phuong Nguyen
(74) *Attorney, Agent, or Firm*—Andrew C. Cheng; Wei Te Chung; Ming Cheh Chang

(57) ABSTRACT

A card connector (100) comprising: a card receiving room (9') for receiving a card and defining a card inserting/ejecting direction (A); a shell (4); a terminal module (7) assembled with shell and receiving a plurality of terminals (32) retained in the housing and protruding into the card receiving room to electrically connect with a card; and an insulating body (5) covered by the shell to define the card receiving room (9') and having a main body comprising a platform (52) protruding into the receiving room, the platform defining a index portion (521) to lead the card insert into the card receiving room; wherein the platform being formed on opposite side of the terminal module for pressing on an inserted card.

20 Claims, 4 Drawing Sheets

CARD CONNECTOR

BACKGROUND OF THE INVENTION

1. Field of the Invention

The present invention relates to a structure of a card connector used for memory cards for using in various portable information equipments, such as a portable telephone or a NoteBook, or memory support equipments such as a digital camera or a digital AV equipment.

2. Description of Prior Arts

A card connector is generally used as an expanded recording apparatus of an electronic equipment such as a personal computer or a digital camera. As a storage medium of the card connector, a PC card or a memory card has come into wide use.

However the personal computer or the digital camera are always shaken or rocked. In such case, the card will get away from an original position, and a desirable connection between the card and the connector is damaged.

Therefore, it is desirable to provide a card connector that eliminates the aforesaid problems.

SUMMARY OF THE INVENTION

An object, therefore, of the invention is to provide a card connector receiving room to achieve a stable connection between the card and the connector.

In the exemplary embodiment of the invention, A card connector comprising: a card receiving room for receiving a card and defining a card inserting/ejecting direction; a shell; a terminal module assembled with shell and receiving a plurality of terminals retained in the housing and protruding into the card receiving room to electrically connect with a card; and an insulating body covered by the shell to define the card receiving room and having a main body comprising a platform protruding into the receiving room, the platform defining an index portion to lead the card insert into the card receiving room; wherein the platform being formed on opposite side of the terminal module for pressing on an inserted card.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
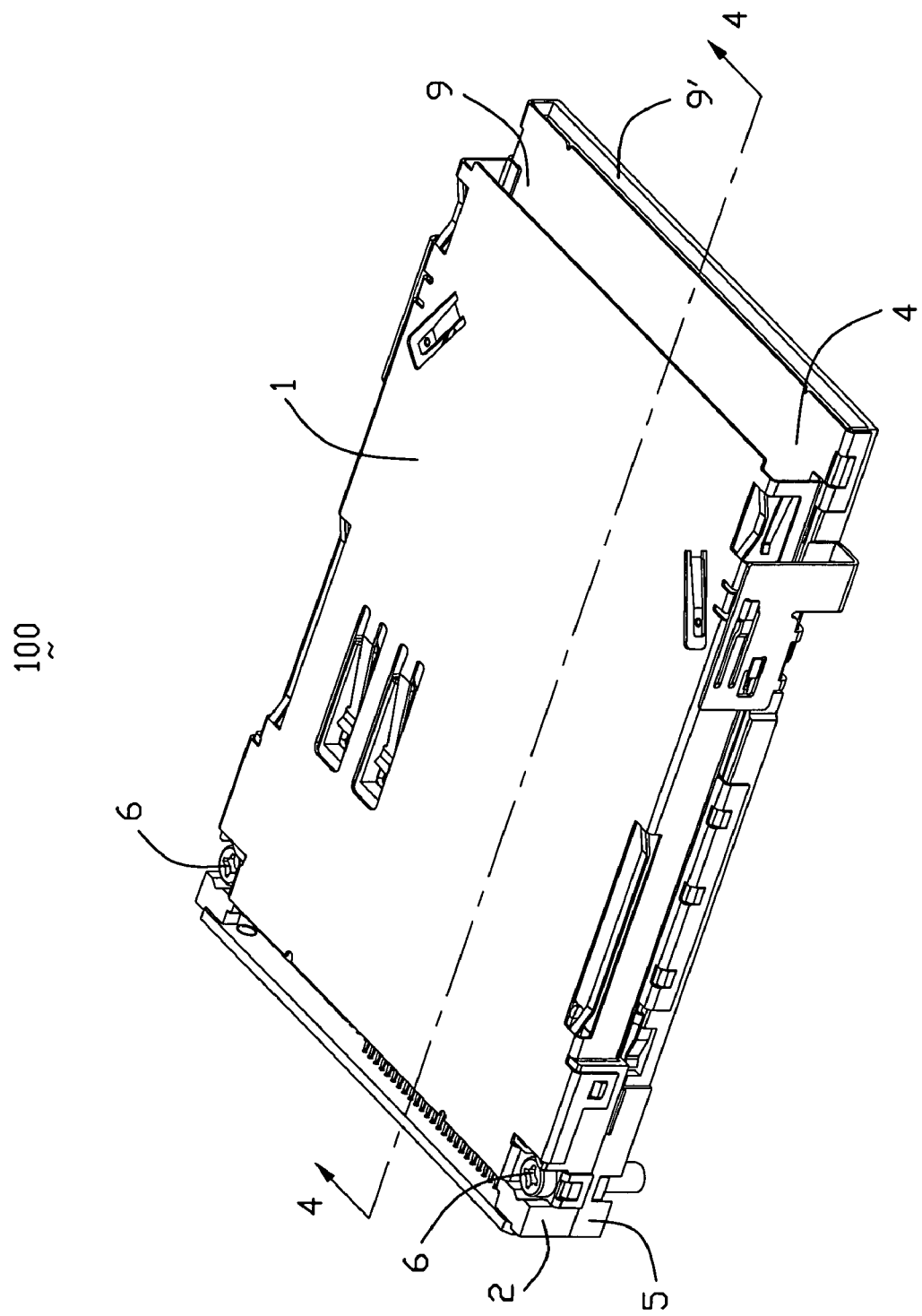
FIG. 1 is a perspective view of a card connector in accordance with present invention.
Figure 2:
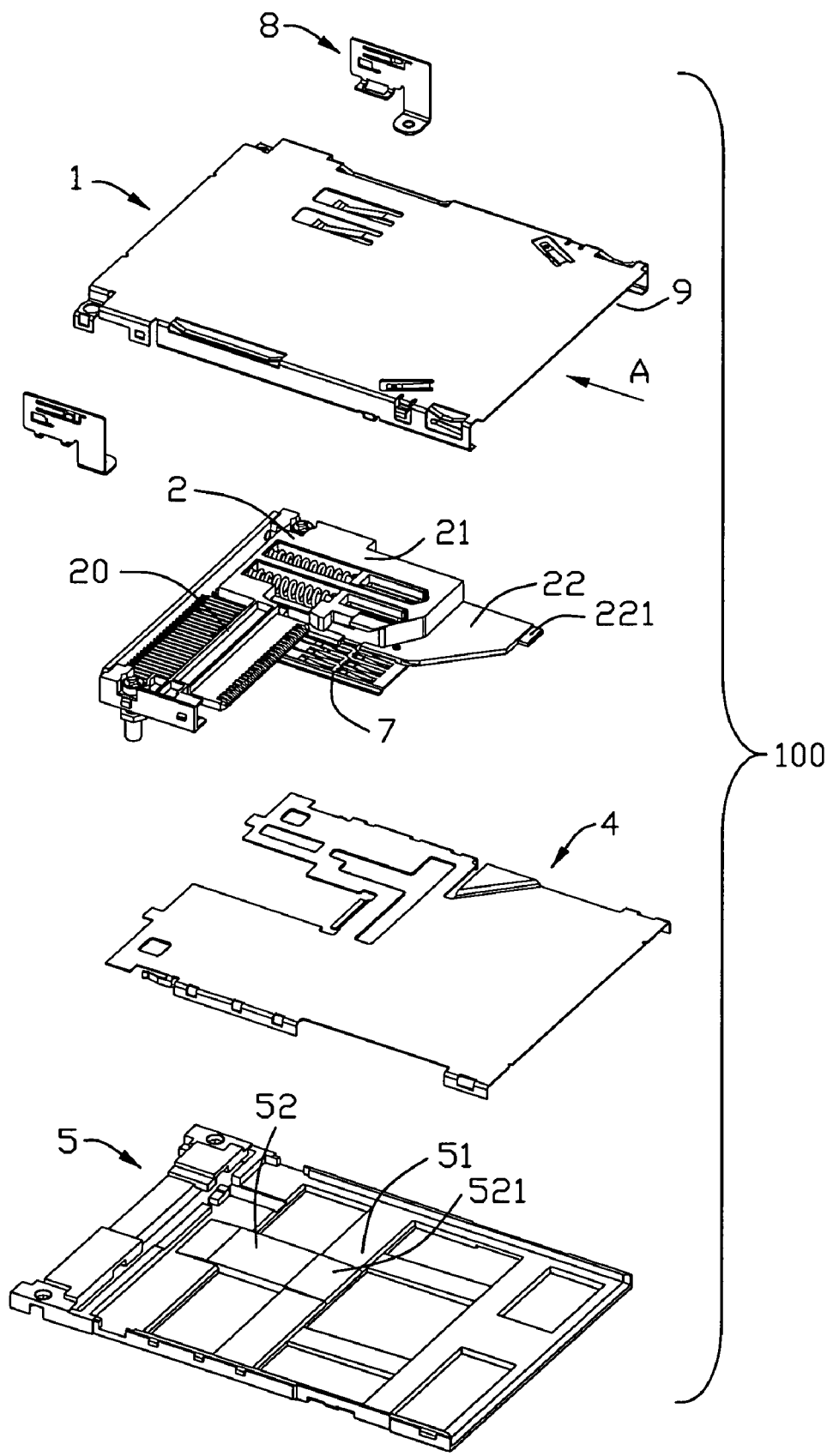
FIG. 2 is an exploded view of the card connector.
Figure 3:
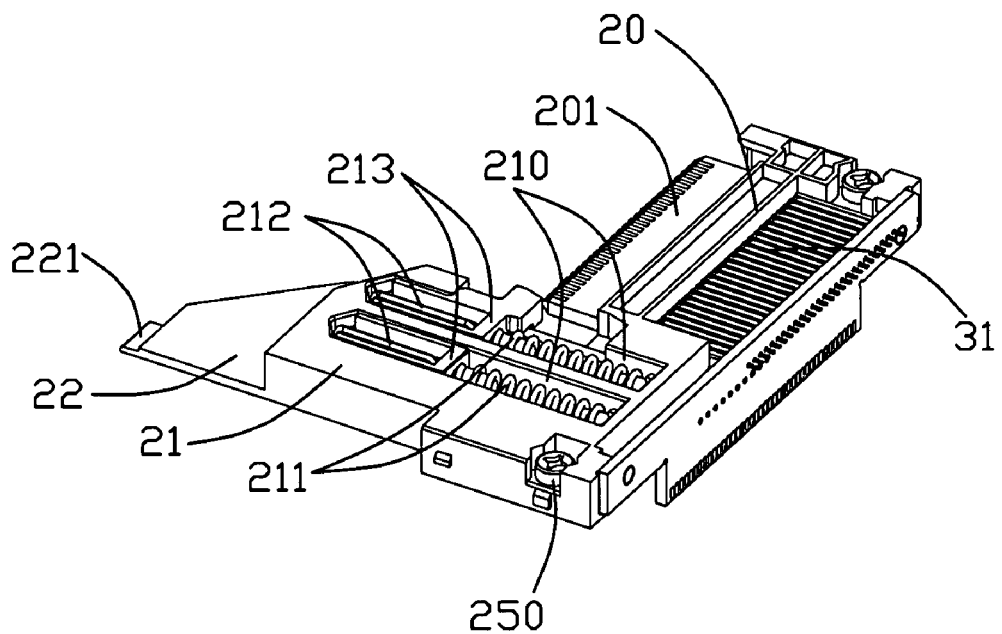
FIG. 3 is a perspective of an insulating body of the card connector is replaced from the card connector.
Figure 3:
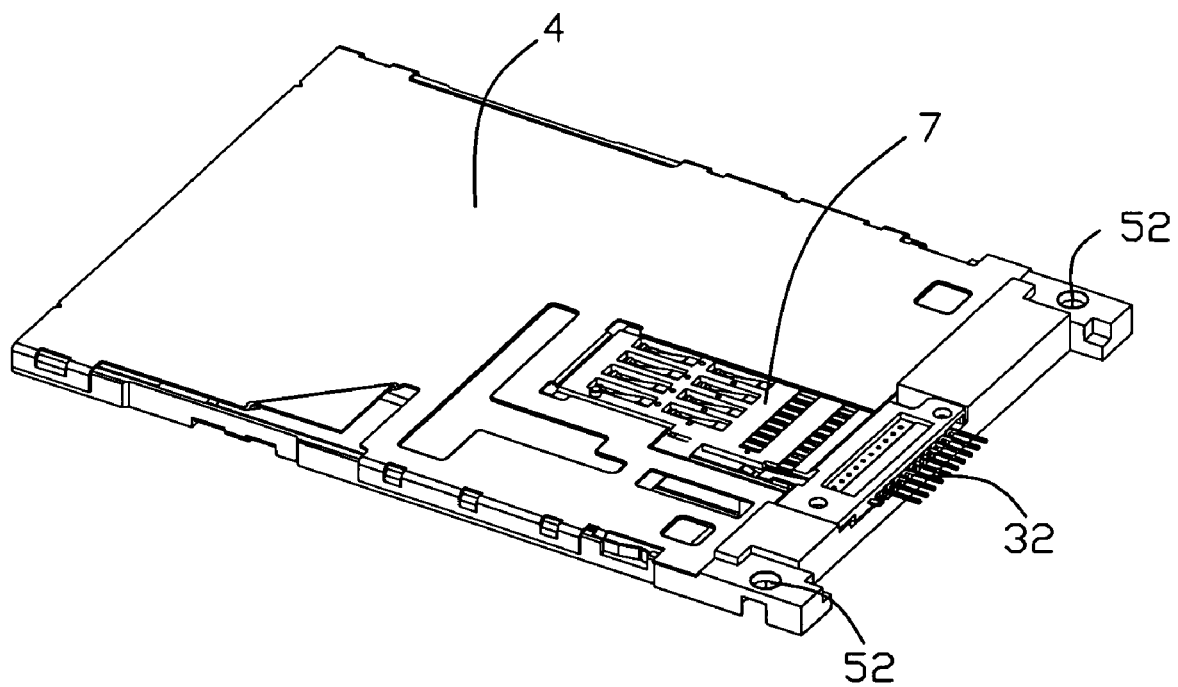
Figure 4:
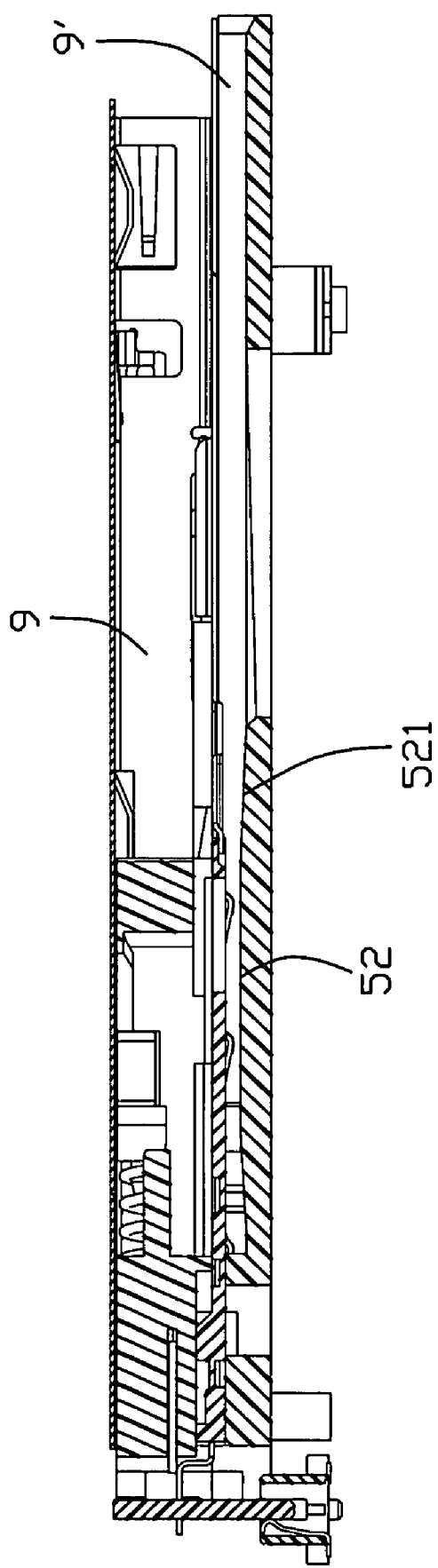
FIG. 4 is a cross-sectional view of FIG. 1 taken along line 4-4.

Referring to FIG. 1 to FIG. 4, a card connector 100 for receiving a first card, such as a Smart Card, and a second card, such as an Express Card, in accordance with present invention comprises a first receiving room 9' and a second receiving room 9 mounted on the first receiving room 9' relative to a printed circuit board (not shown), and each housing is designed with a card opening (not labeled) for a card inserted or ejected.

The first receiving room 9' comprises a first shell 4, a terminal module 7 assembled with the first shell 4, and an insulating body 5 covered by the first shell 4 to define the first receiving room 9'. The terminal module 7 receives a plurality of first terminals 32 protruding into the first receiving room 9' for engaging with the first card. The insulating body 5 comprises a main plate 51 having a platform 52 protruding into the first receiving room 9', the platform 52 are placed right above the terminal module 7 on the first shell 4. And the platform further includes an indexing portion 521, the indexing portion 521 defines an inclined plane (not labeled) to index the inserted card to over the platform 52, and lead the inserted card to be inserted into the first receiving room 9' fully. When the inserted card is inserted fully, the platform 52 presses on the inserted card to achieve a desirable connection between the card and the first terminals 32, regardless a shake or rock of the card connector. The platform 52 integrally molds with the insulating body 5.

The second receiving room 9 comprises an insulating housing 2, a plurality of second terminals 31 retained in the insulating housing 2 and a second shell 1 mounted on the insulating housing 2. The second terminals 31 are arranged in a transverse direction perpendicular to an insertion direction of the card A. The insulating housing 2 comprises a base section 20, a fixing portion 21 integrally extending from one end of the base section 20 and a guiding portion 22 extending from the fixing portion 21 opposite to a card insertion direction. The base section 20 has an engaging plate 201 protruding into the second receiving room 9, and the second terminals 31 protrude out of the engaging plate 201 to engage with the second card. On the fixing portion 21, a pair of grooves 210 is placed in the same direction of the second terminals 31 arranged to receive two ejecting mechanisms (not labeled). The ejecting mechanisms, respectively, comprises an ejecting device 213 protruding into the receiving space, a spring device 211 for moving the ejecting device 213 in the card ejecting direction, a cam follower 212 capable of overcoming the spring device 211 and placing the ejecting device 213 in a desirable position. Each ejecting device 213 has a cam groove (not shown) allowing one end of the cam follower 212 to slide therein. The operating process of the ejecting mechanism is omitted in this specification because it is known as a published skill. The second receiving room 9 is separated into a wider portion and a narrower portion along the card inserting direction by the guiding portion 22 and the guiding portion 22 defines a step portion 221 to cooperate with a complement portion (not labeled) on the shell 4.

The second shell 1, the insulating housing 20 and the insulating body 5 define a pair of screw holes 130, 250 at the opposite ends thereof, respectively. When the first housing 9 and the second housing 9' are assembled, a pair of screws 6 passing through the holes in order to fasten the end portion of the card connector 100. Furthermore, a pair of standing members 8 are mounted on the lateral sides of the card connector 100 to fasten a front portion of the first housing 90 and the second housing 90' together and then printed on the printed circuit board.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector ejector for receiving cards such as a Smart Card and an Express Card comprising:
   a shell comprising first and second shells;
   a first insulating body being covered by the shell to define a first card receiving room and having main plate comprising a platform protruding into the first receiving room, the platform is placed right above the first terminal module on the first shell, the platform defining an index portion to lead the card into the first card receiving room fully;
   the first terminal module assembled with the first shell and receiving a plurality of first terminals protruding into the first card receiving room to electrically connect with the first card; and
   a plurality of second terminals retained in the second receiving room of the insulating housing and a second shell mounted on the insulating housing; the second terminals are arranged in a transverse direction perpendicular to an insertion direction of the card;
   the insulating housing comprises a base section, a fixing portion integrally extending from one end of the base section to form a L-shaped body and a guiding portion extending from the fixing portion opposite to a card insertion direction; the base section has an engaging plate protruding into the second receiving room, and
   on the fixing portion, a pair of grooves is placed in the same direction of the second terminals arranged to receive two ejecting mechanisms; the ejecting mechanisms, respectively, comprises an ejecting device protruding into the receiving space, a spring device for moving the ejecting device in the card ejecting direction, a cam follower capable of overcoming the spring device and a cam groove allowing one end of the cam follower to slide therein to place the ejecting device in a desirable position;
   wherein the platform is formed on opposite side of the terminal module for pressing on an inserted card;
   when the inserted card is inserted fully, the platform presses on the inserted card to achieve a desirable connection between the card and the first terminals, regardless a shake or rock of the card connector.

2. The card connector ejector as claimed in claim 1, further comprises a pair of screw holes at opposite ends of the card.

3. The card connector ejector as claimed in claim 2, wherein the two card receiving rooms are stacked.

4. The card connector ejector as claimed in claim 1, wherein the platform is placed right above the terminals to press the inserted card and achieve a stable connection between the card and the terminals.

5. The card connector ejector as claimed in claim 1, wherein the index portion defines an incline plane to lead the card over the platform, and insert into the first receiving room fully.

6. The card connector ejector as claimed in claim 5, wherein the platform integrally molds with the insulating body.

7. The card connector ejector as claimed in claim 2, wherein said another card receiving room defines a wider portion and a narrower portion along the card inserting direction.

8. The card connector ejector as claimed in claim 7, wherein the fixing portion is placed at a lateral side of the narrower portion of said another card receiving room and the second terminals protrude out of the engaging plate to engage with the second card.

9. The card connector ejector as claimed in claim 8, wherein a pair of standing members are mounted on the lateral sides of the card connectors.

10. The card connector ejector as claimed in claim 9, wherein the two grooves are placed along a transverse direction perpendicular to the inserting direction.

11. The card connector ejector as claimed in claim 10, wherein each of the ejecting mechanism is urged by the inserted card.

12. The card connector ejector as claimed in claim 8, the guiding portion defines a step portion to cooperate with a complement portion on the shell.

13. An electrical card connector ejector for receiving Smart Card and an Express Card comprising:
    first and second ports stacked with each other each defining a card receiving cavity;
    a plurality of first contacts extending into the card receiving cavity of the first port;
    a plurality of second contacts extending into the card receiving cavity of the second port;
    an area occupied by the first contacts and located around a rear portion of said first port, said area being much smaller than remainders of said first port; and
    a main plate belonging to the first port and located on opposite side of the card receiving cavity with regard to the area,
    a plurality of insulating body being covered by a plurality of shells to define the plurality of receiving cavities, and having the main plate comprising a platform, the platform defining an inclined front section for easing insertion of the card;
    the terminal modules assembled with the shells; and
    a plurality of terminals and one of the terminals are arranged in a transverse direction perpendicular to an insertion direction of the card;
    the insulating housing comprises a base section, a fixing portion integrally extending from one end of the base section to form a L-shaped body and a guiding portion extending from the fixing portion opposite to a card insertion direction; the base section has an engaging plate protruding into one of the receiving cavity, and
    on the fixing portion, a pair of grooves is placed in the same direction of one of the terminals arranged to receive ejecting mechanisms; the ejecting mechanisms, respectively, comprises an ejecting device protruding into the receiving space, a spring device for moving the ejecting device in the card ejecting direction, a cam follower capable of overcoming the spring device and a cam groove allowing one end of the cam follower to slide therein;
    wherein the platform is formed on opposite side of the terminal module for pressing on an inserted card;
    said main plate forming a raised platform thereon corresponding to the area so as to form a narrower space therebetween in a vertical direction, in comparison with other portions in the card receiving cavity, for efficiently holding an electronic card therebetween and easing manufacturing the connector and assembling the card.

14. The electrical card connector ejector as claimed in claim 13, wherein said main plate is insulative.

15. The electrical card connector ejector as claimed in claim 13, wherein.

16. The electrical card connector ejector as claimed in claim 13, wherein said area is essentially located around a middle level between the first port and the second port.

17. The electrical card connector ejector as claimed in claim 13, wherein said first contacts are disposed in the terminal module which cooperates with a metallic shield both located around said middle level to separate said first port and said second port.

18. The electrical card connector ejector as claimed in claim 17, further including an insulative housing defining a large truncated triangular guiding portion which cooperates with a raised small triangular guiding section to form a complete large triangular guiding device for guiding insertion of another card inserted into the second port.

19. A card connector ejector for receiving a Smart Card and an Express Card, comprising: first and second ports stacked with each other each defining a card receiving cavity;

a plurality of first contacts extending into the card receiving cavity of the first port;

a plurality of second contacts extending into the card receiving cavity of the second port; an insulative housing located between said first port and said second port and defining a main body to receive the second contacts and a large truncated triangular guiding portion in front of the main body; and a metallic shield located between said first port and said second port and defining a small raised triangular section to cooperate with said large truncated triangular portion to form a complete large triangular device for guiding insertion of an electronic card into the card receiving cavity of the second port; wherein said large truncated triangular portion is thicker than the small raised triangular section;

the insulating housing comprises a base section, a fixing portion integrally extending from one end of the base section and a guiding portion extending from the fixing portion opposite to the card insertion direction; the base section has an engaging plate protruding into a second receiving cavity, and on the fixing portion, a pair of grooves is placed in the same direction of the second terminals arranged to receive two ejecting mechanisms; the ejecting mechanisms, respectively, comprises an ejecting device protruding into the ports, a spring device for moving the ejecting device in the card ejecting direction, a cam follower capable of overcoming the spring device and a cam groove allowing one end of the cam follower to slide therein to place the ejecting device in a desirable position;

wherein a platform is formed on opposite side of the terminal module for pressing on inserted card, and the platform defining an index portion to lead the card into the first port fully.

20. The electrical card connector ejector as claimed in claim 19, wherein said guiding portion further includes a step portion to be received in a recess formed in said raised triangular section.

* * * * *